US012695404B2

(12) United States Patent  (10) Patent No.: US 12,695,404 B2
    Saadat                              (45) Date of Patent:      Jul. 28, 2026

(54) METHOD OF OPERATING A POWER SUPPLY CIRCUIT IN AN INVERTER FOR DRIVING AN ELECTRICAL MACHINE, COMPUTING UNIT, POWER SUPPLY CIRCUIT OF AN INVERTER AND INVERTER

(71) Applicant: SEG Automotive Germany GmbH, Stuttgart (DE)

(72) Inventor: Nima Saadat, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 258 days.

(21) Appl. No.: 18/627,330

(22) Filed: Apr. 4, 2024

(65) Prior Publication Data

US 2024/0339948 A1      Oct. 10, 2024

(30) Foreign Application Priority Data

Apr. 4, 2023    (DE) ......................... 102023108645.6

(51) Int. Cl.
    *H02P 27/06*            (2006.01)
(52) U.S. Cl.
    CPC .................................... *H02P 27/06* (2013.01)
(58) Field of Classification Search
    CPC .... H02P 27/06; H02M 7/53871; H02M 1/088
    USPC ................................................. 318/504, 494
    See application file for complete search history.

(56) References Cited

U.S. PATENT DOCUMENTS

| | | | |
|---|---|---|---|
| 7,595,597 B2 * | 9/2009 | King ....................... | B60L 50/40 |
| | | | 318/106 |
| 7,768,237 B2 | 8/2010 | Tarchinski | |
| 9,637,009 B2 * | 5/2017 | Sugiura ................... | B60L 50/51 |
| 10,910,981 B2 * | 2/2021 | Tanahashi ............... | H02M 1/32 |
| 2019/0061653 A1 | 2/2019 | Takahashi et al. | |

FOREIGN PATENT DOCUMENTS

| | | |
|---|---|---|
| DE | 102004057693 A1 | 6/2006 |
| DE | 102007022515 A1 | 11/2008 |
| DE | 102010029808 A1 | 6/2011 |
| DE | 102013224884 A1 | 6/2015 |
| DE | 102017209105 A1 | 12/2018 |
| DE | 102018221989 A1 | 6/2020 |

* cited by examiner

*Primary Examiner* — David Luo
(74) *Attorney, Agent, or Firm* — Cozen O'Connor

(57)               ABSTRACT

A power supply circuit in an inverter for driving an electrical machine includes a high-voltage branch with a high-voltage level, a low-voltage branch with a low-voltage level and a discharge branch with a discharge voltage level, wherein the high-voltage level is higher than the low-voltage level and the discharge voltage level. The high-voltage branch can be connected to the low-voltage branch via an operating DC/DC converter, and to the discharge branch via a discharge DC/DC converter. The discharge branch is different from the low-voltage branch. A low-voltage energy storage device is connected in the discharge branch. A method for using the power supply circuit includes, in a first operating mode, conducting current from the high-voltage branch via the operating DC/DC converter into the low-voltage branch, and in a second operating mode, conducting current from the high-voltage branch via the discharge DC/DC converter into the discharging branch.

17 Claims, 4 Drawing Sheets

METHOD OF OPERATING A POWER SUPPLY CIRCUIT IN AN INVERTER FOR DRIVING AN ELECTRICAL MACHINE, COMPUTING UNIT, POWER SUPPLY CIRCUIT OF AN INVERTER AND INVERTER

CROSS-REFERENCE TO RELATED APPLICATIONS

This application claims priority to German Patent Application No. 102023108645.6 filed Apr. 4, 2023 which is hereby incorporated by reference.

TECHNICAL FIELD

The present disclosure relates to a method for operating a power supply circuit in an inverter for driving an electrical machine, a computing unit for carrying out the method, a power supply circuit of an inverter and an inverter.

BACKGROUND

A power supply circuit of an inverter or in an inverter is also referred to as a PDN or PDTN (power distribution network or power distribution tree network) in modern vehicle applications with an electric drive. The task of this power distribution network is, among other things, to distribute power to the various components or consumers of the inverter, such as sensors, communication circuits (e.g. CAN, LIN transceivers) and in particular the gate driver circuits for high-side (HS) and low-side (LS) switches, and functional safety circuits or MCU (microcontroller unit), etc. In this sense, the inverter is a device which internally has the power supply circuit and components supplied by it, including switches, e.g. in the form of half bridges, and terminals for connecting external power sources and an electrical machine.

Nowadays, due to functional safety requirements, there can be two main power sources for the PDN. A common power source in electric vehicles (EV) is low-voltage batteries (e.g. 12 V), also known as the KL.30 network or low-voltage branch. A second source can be a high-voltage DC battery or the high-voltage DC bus (high-voltage branch) with a nominal voltage of 400 V to more than 1,000 V, for example. Such high-voltage, HV, networks can be used in particular as a power supply for an electric traction drive, such as a permanent magnet synchronous motor (PMSM), which is connected to the high-voltage branch via the inverter.

However, the use of an HV drive train increases the risk of electric shock, particularly in the event of accidents. The ECC R94 standard therefore requires that the DC bus capacitor voltage should drop to a safe voltage (maximum 60 V) in less than 5 seconds.

U.S. Pat. No. 7,768,237 B2 and U.S. Pat. No. 9,637,009 B2 each describe a discharge circuit with a series connection of a switch and a resistor.

DE 10 2007 022 515 A1 describes the discharging of an intermediate circuit capacitor via an inverter.

DE 10 2004 057 693 A1 shows a device for rapidly discharging a capacitor, in particular an intermediate circuit capacitor, via a DC/DC converter in an on-board electrical network with a starter generator as the electrical machine and an associated voltage converter, in which a controlled or regulated DC/DC converter is used as the DC/DC converter, the output voltage of which on the vehicle electrical network side is raised relative to the normal state after the electrical machines are switched off and the inverter is switched off, as a result of which the charges to be discharged are supplied to the battery connected to the voltage converter.

SUMMARY

According to the disclosure, a method for operating a power supply circuit in an inverter for controlling an electrical machine, a computing unit for carrying out the method, a power supply circuit in an inverter and an inverter with the features of the independent patent claims are proposed. Advantageous embodiments are the subject of the dependent claims and the following description. It should be emphasized that the features and advantages described below apply equally to the power supply circuit and the method for operating such a circuit.

The power supply circuit in the inverter has at least three different branches, namely a high-voltage branch, a low-voltage branch and a discharge branch. The high-voltage branch is designed to be connected to a high-voltage network (in particular in the vehicle) and the low-voltage branch is designed to be connected to a low-voltage network (in particular in the vehicle), with a nominal voltage level of the high-voltage network being higher than a nominal voltage level of the low-voltage network. The high-voltage branch and the low-voltage branch have corresponding terminals for connecting to the high-voltage network or low-voltage network. In particular, these terminals are led out of a housing of the inverter. The nominal voltage level of the high-voltage network (hereinafter also referred to as the high-voltage level) can, for example, be significantly higher than a permissible touch voltage of 60 V in particular, e.g. up to several hundred volts. The nominal voltage level of the low-voltage system (hereinafter also referred to as the low-voltage level) can, for example, correspond to standard vehicle low voltages of 12 V or 24 V, for example. The low-voltage branch is used or set up to distribute power to the components or consumers of the inverter, such as sensors, communication circuits (e.g. CAN, LIN transceivers) and in particular the gate driver circuits for high-side (HS) and low-side (LS) switches, logic circuits (such as discrete or integrated circuits (e.g. IC, ASIC) or so-called MCU (microcontroller unit)) and functional safety circuits etc.

The disclosure describes a way of reducing a high and dangerous voltage of the high-voltage network in the vehicle in the event of a fault, e.g. in the event of an accident involving the vehicle or in the event of a fault or failure of the inverter, in a single device, namely the inverter, as quickly as possible to a permissible contact voltage value of at most 60 V, which is specified here by the discharge voltage level. The invention requires only very few regular components and can therefore be realized very simply and cost-effectively, also with regard to the control. The invention is implemented in the inverter for controlling the electrical machine in the vehicle and is therefore very easy to implement in a vehicle.

To this end, the invention makes use of the measure of discharging the high-voltage network (which is connected to the high-voltage branch of the inverter) via the discharge DC/DC converter of the inverter into the discharge branch of the inverter power supply circuit—in particular in the event of a fault—to reduce the high-voltage voltage below the high-voltage level to the discharge voltage level, whereby the energy in the discharge branch is stored in a low-voltage energy storage device, for example a capacitor or a battery, and/or is converted into heat in a low-voltage resistor as an energy sink.

The method comprises conducting current from the high-voltage branch via the operating DC/DC converter to the low-voltage branch in a first operating mode (hereinafter also referred to as normal operating mode), and conducting current from the high-voltage branch via the discharge DC/DC converter to the discharging branch in a second operating mode (hereinafter also referred to as discharging mode), the discharge voltage level being at most 60 V.

In the normal operating mode, in particular, no current is conducted from the high-voltage branch via the discharge DC/DC converter into the discharging branch, whereas in the discharging mode, current can still be conducted from the high-voltage branch via the operating DC/DC converter into the low-voltage branch, or not.

In particular, the low-voltage energy storage device can be dimensioned in such a way that it can absorb all the energy from a connected high-voltage network. The energy stored in the low-voltage energy storage device then no longer poses a danger to vehicle occupants and can, for example, be discharged at a low rate via a resistor as an energy sink, which is connected in parallel to the low-voltage energy storage device, or recovered when the fault is rectified. Recharging the energy from the high-voltage network into a capacitor as a low-voltage energy storage device can be advantageously faster than storing it in a battery as a low-voltage energy storage device, but the energy can be stored in the battery for longer.

The low-voltage energy storage device can also be dimensioned in such a way that it cannot absorb all of the energy from a connected high-voltage network, whereby the energy is then discharged at a high rate, for example, via a resistor as an energy sink that is connected in parallel to the low-voltage energy storage device. This can also quickly eliminate any danger emanating from the high-voltage network.

When the energy is stored in the low-voltage energy storage device, it does not harm people in terms of voltage level. The stored energy can then—if necessary—be stretched over time and, in particular, converted into heat much more slowly than is conventionally the case, especially via a resistor as an energy sink. This significantly reduces the power requirement of both the resistor and the associated cooling. The energy can—if possible—also be reused if the fault condition can be rectified quickly. In a third operating mode, energy stored in the discharge branch can be fed back into the high-voltage branch (and via this into a connected high-voltage network), whereby the discharge DC/DC converter in this case is advantageously a bidirectional DC/DC converter. If necessary, a further feedback DC/DC converter could also be provided.

Operating DC/DC converter and discharge DC/DC converter can be implemented using the same DC/DC converter. This allows parts and components to be saved.

In one embodiment, the discharge voltage level of the discharge branch is kept constant in the second operating mode (i.e. while the high-voltage branch is connected to the discharge branch via the discharge DC/DC converter and current flows from the high-voltage branch into the discharge branch). For example, the discharge DC/DC converter can be operated in a mode in which it keeps the output voltage at a constant value. Together with the (also constant) resistance value of the discharge resistor, this results in a constant discharge rate of the high-voltage branch.

In one embodiment, the discharge voltage level of the discharge branch in the second operating mode corresponds to the low-voltage level. This means that the low-voltage branch can also be supplied from the discharge branch if they are electrically connected.

In one embodiment, in the second operating mode the discharge voltage level of the discharge branch is higher than the low-voltage level. The higher the discharge voltage level during the discharge process, the more power can be transferred from the high-voltage branch to the discharge branch.

In one embodiment, the discharge DC/DC converter is a non-isolating DC/DC converter, such as a buck converter, synchronous converter, SEPIC converter (single ended primary inductance converter), Ćuk converter, zeta converter, etc. With non-isolating DC/DC converters, there is no electrical isolation between the input network and the output network. These are usually inexpensive to use.

In one embodiment, the discharge DC/DC converter is an isolating DC/DC converter, such as a fly-back converter, forward converter, push-pull converter, etc. With insulating DC/DC converters, there is galvanic isolation between the input network and the output network, which is usually achieved by means of a transformer. These have increased safety, but are more complex in terms of weight, installation space and costs. In the high-voltage range (>60 V), the use of an insulating DC/DC converter is advantageous or even mandatory for safety reasons.

In one embodiment, the discharge DC/DC converter is a bidirectional DC/DC converter. In this case, energy stored in the discharge branch can be fed back into the high-voltage branch. In this case, the energy is not lost as heat. In one embodiment, current from the discharging branch is thus fed into the high-voltage branch via the discharge DC/DC converter in a third operating mode.

In one embodiment, a current intensity of a current flowing into the discharge branch is regulated. This can prevent an overload or damage to the discharge branch.

In one embodiment, a discharge circuit is provided which has a storage device disconnector to connect the low-voltage energy storage device in parallel with an output of the discharge DC/DC converter and disconnect it from it, and/or has a mains disconnector to connect and disconnect the low-voltage branch and the discharge branch. This is a very simple measure in terms of design and circuitry in order to realize the different operating modes mentioned. The switches can be semiconductor switches or mechanical switches (relays). If the aforementioned switches are implemented as semiconductor switches, the current intensity of the current flowing through the switches can be controlled in conjunction with a current intensity measurement.

In one embodiment, the mains disconnector is closed (conducting) and the storage device disconnector is open (non-conducting) in the first operating mode. This corresponds to normal operation, with no current flowing into the discharge branch. The discharge voltage level of the discharge branch is undefined.

In one embodiment, the discharge branch and the low-voltage branch are electrically connected in the second operating mode, and the discharge voltage level corresponds to the low-voltage level. This can be realized, for example, by the storage device disconnector and the mains disconnector being closed (i.e. conductive). This corresponds to discharge mode in which the discharge branch and the low-voltage branch are connected. In this case, the energy or current from the high-voltage branch can also be used to supply the low-voltage branch and thus to supply the components of the inverter in parallel with storage device in the discharge branch.

In one embodiment, the discharge branch and the low-voltage branch are not electrically connected in the second operating mode, and the discharge voltage level is higher than the low-voltage level. This can be realized, for example, by the storage device disconnector being closed (conductive) and the mains disconnector being open (non-conductive). This corresponds to a discharging mode in which the discharging branch and the low-voltage branch are not connected. In this case, more energy can be stored in the discharge branch. In one embodiment, the storage device disconnector is closed first and the mains disconnector is opened with a delay. This serves to maintain an uninterrupted current flow via the DC/DC converter in order to prevent damage to the vehicle electrical network.

A computing unit according to the disclosure, e.g. an integrated circuit (e.g. IC, ASIC or FPGA), is set up, in particular in terms of program and/or circuit technology, to carry out a method according to the disclosure. A power supply circuit of an inverter with such a computing unit and an inverter with such a power supply circuit are also a subject-matter of the disclosure.

This solution is advantageous as the discharge option is integrated directly into the inverter's power supply circuit. Necessary components such as switches, coils, capacitors etc. are already present there. This means that the invention can be advantageously implemented directly in the inverter, which in turn is advantageously structurally connected to an electrical machine and serves to connect the AC voltage terminals of the electrical machine to DC voltage terminals of the vehicle electrical network, in particular the high-voltage branch.

In particular, the power supply circuit has terminals for a high-voltage network and terminals for a low-voltage network and is set up to generate a supply voltage for components of the inverter, in particular from a high-voltage voltage applied to the high-voltage network terminals and/or from a low-voltage voltage applied to the low-voltage network terminals.

Further advantages and embodiments of the disclosure are shown in the description and the accompanying drawing.

The disclosure is illustrated schematically in the drawing by means of embodiment examples and is described below with reference to the drawing.

DETAILED DESCRIPTION

In the following, embodiments of the disclosure are described in a coherent and comprehensive manner with reference to the figures. In order to reduce the complexity of the figures, not all connections and signal flows are shown. Return lines or ground or negative lines are also not shown in all events.

Figure 1:
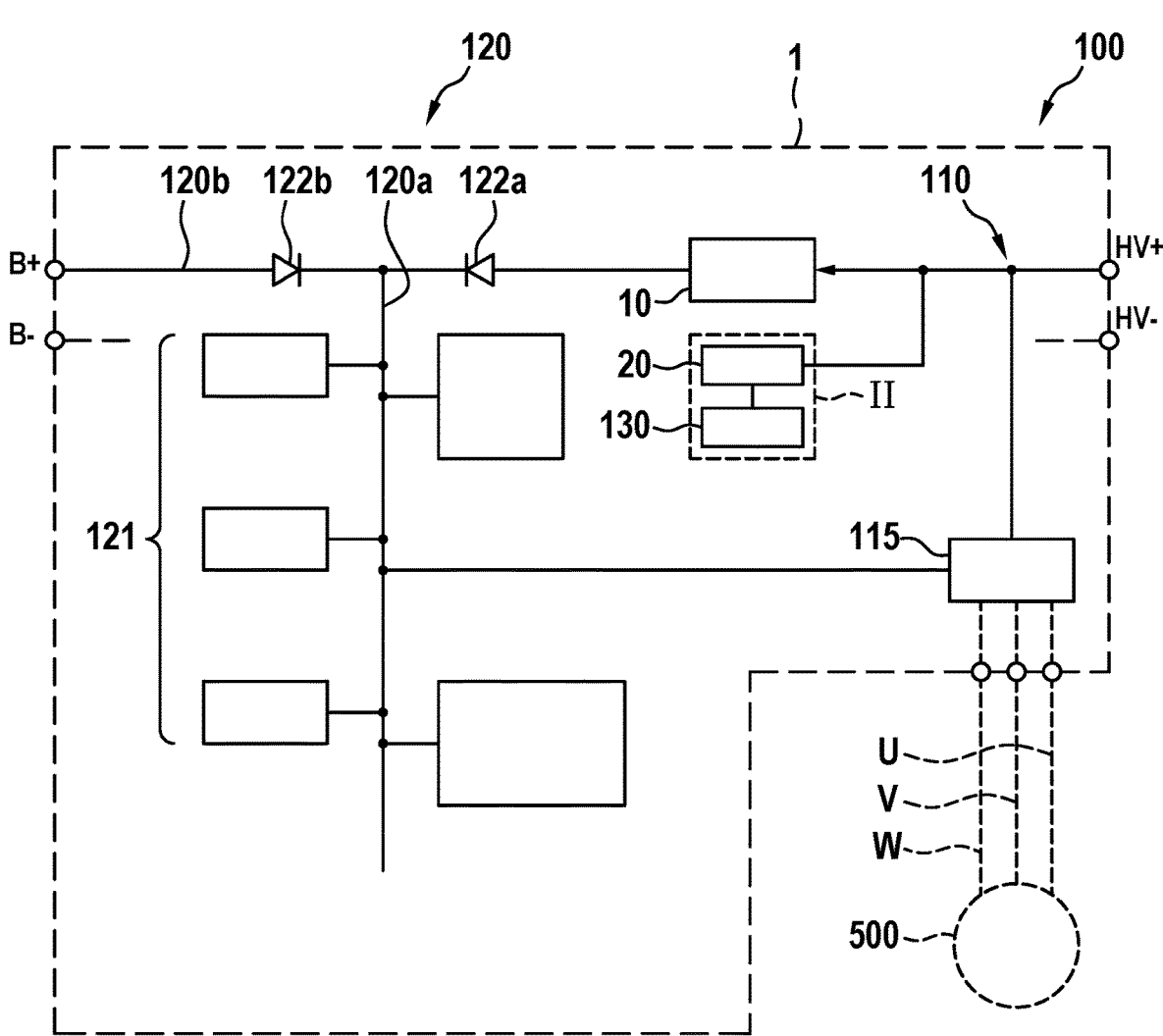
FIG. 1 schematically shows a power supply circuit of an inverter, in embodiments.

FIG. 1 schematically shows an embodiment of a power supply circuit 100 according to the disclosure in an embodiment of an inverter 1 according to the disclosure. In vehicles, an inverter is usually a component or device that controls the electrical machine. In particular, the inverter can implement torque and speed control and convert the DC voltage on the vehicle electrical network side into AC voltage on the engine side and—in the case of recuperation—vice versa, convert the AC voltage on the engine side into DC voltage on the vehicle electrical network side and feed it into the vehicle electrical network.

The power supply circuit 100 has a high-voltage branch 110 with a high-voltage terminal HV+ for connecting a high-voltage network with a high-voltage level, a low-voltage branch 120 with a low-voltage terminal B+ for connecting a low-voltage network (so-called KI.30 network) with a low-voltage level and a discharge branch 130 with a discharge voltage level. The high-voltage level is in the range of 300 V to 1,000 V, for example. The associated negative terminal HV—is only indicated. The low-voltage level can be 12 V or 24 V, for example, and the discharge voltage level is at most 60 V, i.e. it is safe to touch. The associated negative terminal B—or vehicle ground is only indicated. The use of a high-voltage network in a vehicle increases the risk of electric shock, particularly in the event of an accident. The disclosure therefore provides a way of quickly reducing the voltage present in the high-voltage network to a safe-to-touch level, in this case the discharge voltage level, in the event of a fault.

The high-voltage branch 110 is connected to the low-voltage branch 120 via an operating DC/DC converter 10. The high-voltage branch 110 is also connected to the discharge branch 130 via a discharge DC/DC converter 20.

The low-voltage branch 120 has an supply branch 120a, which in the broadest sense serves to supply power to the components of the inverter 1, and a mains branch 120b, which can be connected to the low-voltage network. The supply branch 120a can also be referred to as PDN (see above). The supply branch 120a is connected via diodes 122a, 122b as blocking circuits on the one hand to the operating DC/DC converter 10 and on the other hand to the mains branch 120b. The supply branch 120a, the mains branch 120b and the operating DC/DC converter 10 are electrically connected via the blocking circuit in such a way that a current flow from the supply branch 120a into the operating DC/DC converter 10 is blocked, a current flow from the supply branch 120a into the mains branch 120b is blocked and a current flow from the mains branch 120b into the operating DC/DC converter 10 is blocked.

In the supply branch 120a, one or more low-voltage consumers 121 of the inverter 1, which are only indicated schematically, are also arranged, e.g. sensors (e.g. speed, angular position, temperature, etc.), communication devices (CAN transceiver, LIN transceiver, etc.), a (functional) safety control device, higher-level control (such as a so-called MCU), energy management circuits (for example in the form of a so-called PMIC (power management IC, integrated circuit) or safety PMIC), etc.

An inverter circuit 115 is also arranged on the supply side in the supply branch 120a. The inverter circuit 115 is used to connect the AC voltage terminals U, V, W (three in the example shown) of an electrical machine 500, which is not part of the power supply circuit 100, to the positive DC voltage terminal HV+ and the negative DC voltage terminal HV− of the high-voltage branch 110. For this purpose, the inverter circuit 115 can comprise a logic circuit or gate driver circuit for generating control signals, associated power supplies for the gate driver circuit and a number of semiconductor switches to be controlled by means of the control signals.

The inverter 1 (i.e. the entire device) has a housing from which the terminals HV+, HV−, B+, B−, U, V, W and, in particular, communication (e.g. CAN, LIN, etc.) and/or sensor (e.g. speed, angular position, temperature, etc.) and/ or other terminals are led out. The inverter 1 can advantageously be structurally connected to the electrical machine 500, i.e. in particular attached to it.

Figure 2A:
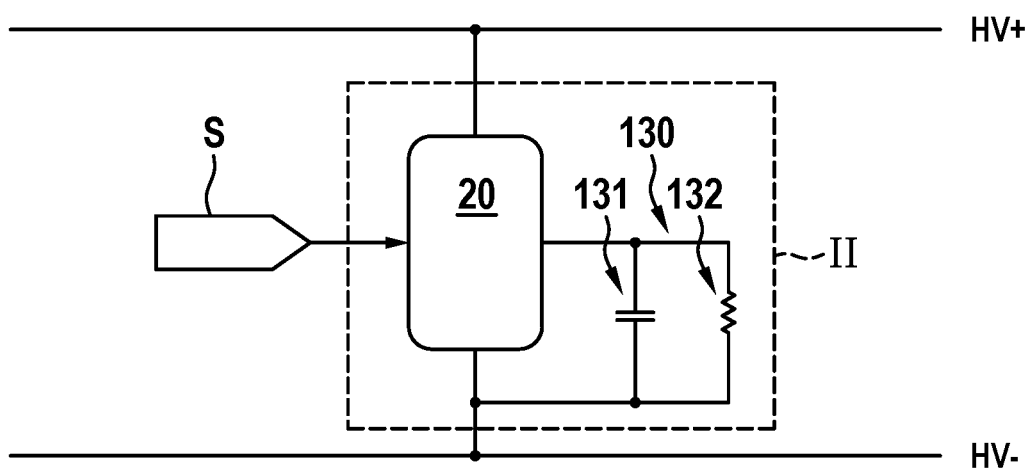
FIG. 2a schematically shows a discharge branch, in embodiments.
Figure 2B:
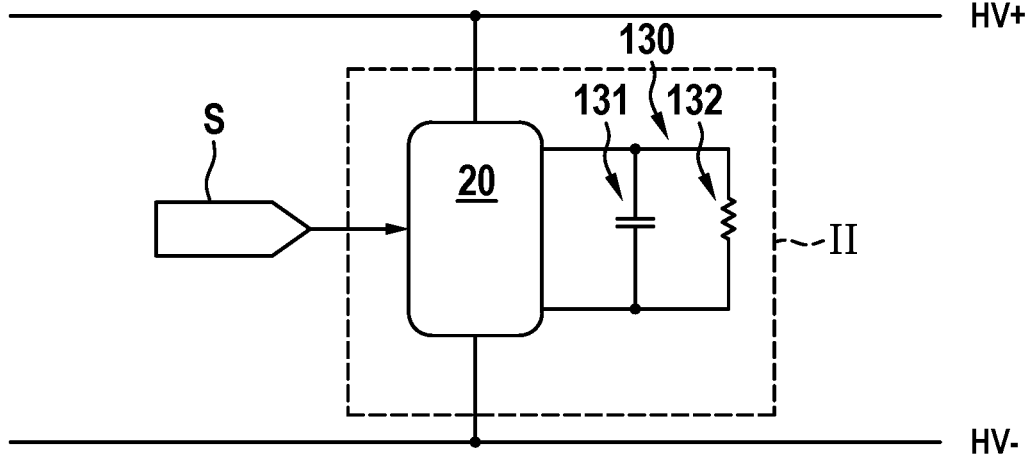
FIG. 2b schematically shows a further discharge branch, in embodiments.

Different embodiments of the discharge branch (section II) are shown in FIGS. 2a and 2b. The discharge DC/DC converter 20 is designed as a non-insulating DC/DC converter in the case of FIG. 2a and as an insulating DC/DC converter in the case of FIG. 2b.

A capacitor 131 is connected in the discharge branch 130 as a low-voltage energy storage device. Furthermore, in the present example, a resistor 132 is connected in the discharge branch 130 as a low-voltage energy sink, wherein the capacitor 131 and the resistor 132 are connected in parallel. In this way, energy stored in the capacitor 131 can be converted into heat in the resistor 132. Instead of the capacitor 131, a battery can also be used as a low-voltage energy storage device.

Figure 3:
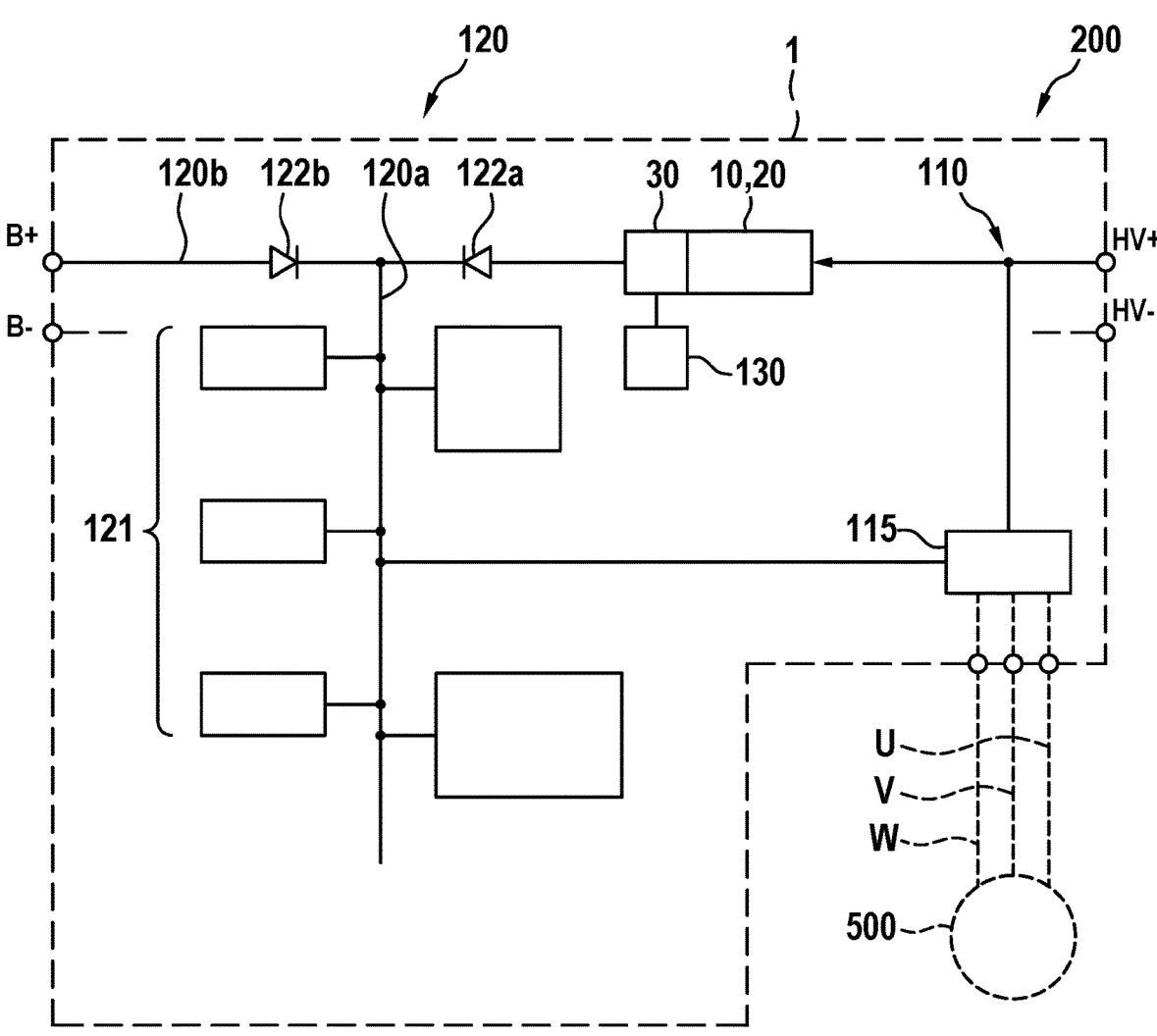
FIG. 3 schematically shows a further power supply circuit of an inverter, in embodiments.

FIG. 3 shows an embodiment 200 of the power supply circuit which corresponds to the embodiment according to FIG. 1 with regard to the high-voltage branch 110 and the low-voltage branch 120, but differs from the embodiment 100 according to FIG. 1 with regard to the discharge branch 130. In particular, here the operating DC/DC converter 10 is simultaneously the discharge DC/DC converter 20. The discharging branch 130 is connected on the low-voltage side of the DC/DC converter 10, 20 via a discharging circuit 30. The discharge circuit 30 can be part of the DC/DC converter 10, 20 or can be separate from it.

Figure 4:
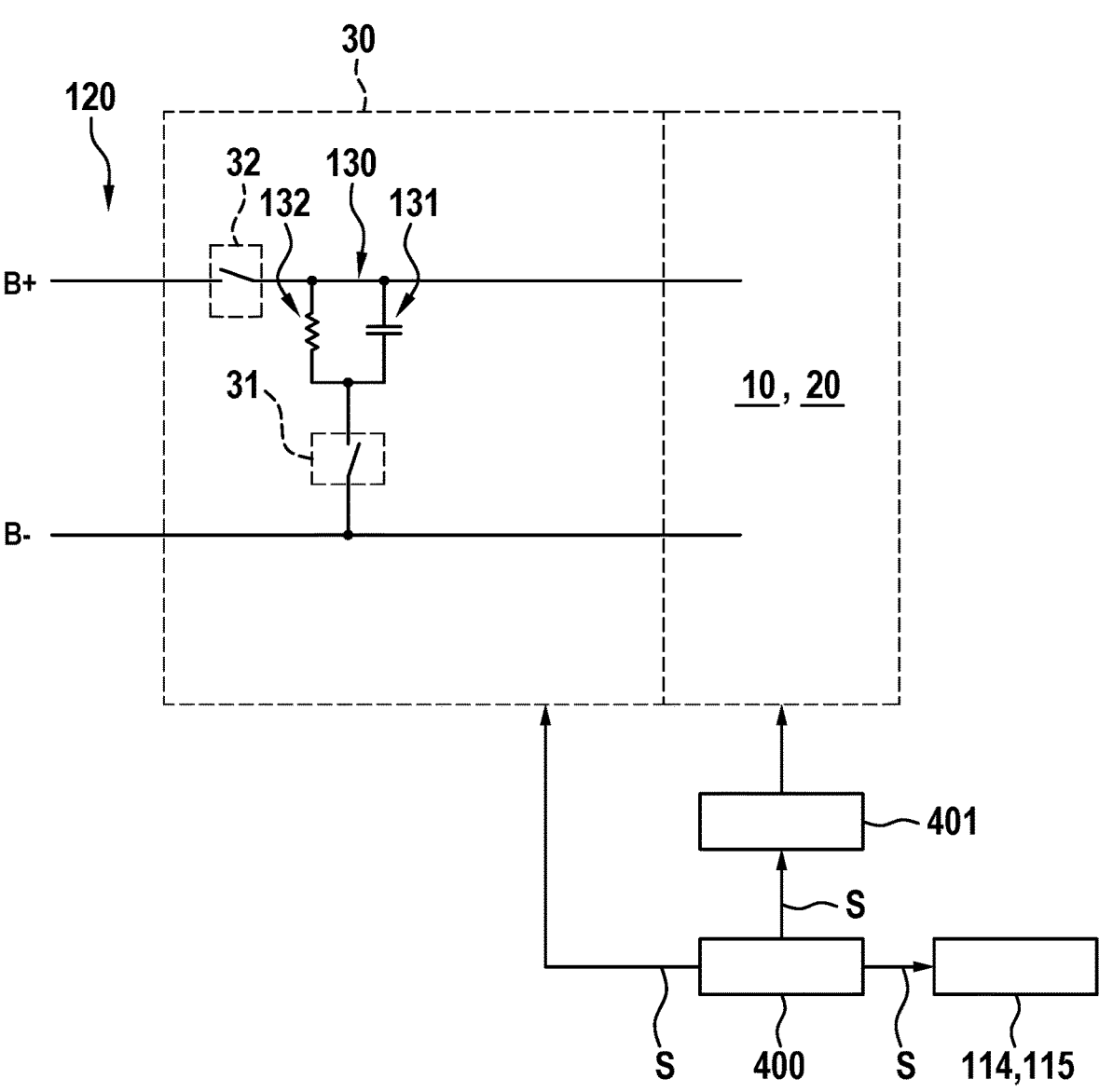
FIG. 4 schematically shows a further discharge branch, in embodiments.

The discharge circuit 30 with discharge branch 130 is shown schematically in FIG. 4 and, in the example shown, has a storage device disconnector 31 for connecting the capacitor 131 in parallel with an output of the discharge DC/DC converter 20 and disconnecting it therefrom, and a mains disconnector 32 for connecting and disconnecting the low-voltage branch 120 and the discharge branch 130. Storage device disconnector 31 and mains disconnector 32 can each be designed optionally as an electronic switch (e.g. semiconductor switch, transistor) or mechanical switch (e.g. relay). Furthermore, a current measuring means (not shown) may be provided for measuring the current flowing through the storage device disconnector 31.

In the various embodiments shown, the power supply circuit 100, 200 can be operated in a first operating mode (normal operating mode) such that current or energy flows from the high-voltage branch 110 via the operating DC/DC converter 20 into the low-voltage branch 120. At the same time, no current is usually conducted into the discharge branch 130 in the first operating mode.

In the embodiment according to FIG. 1, this can be realized in such a way that the operating DC/DC converter 10 is operated normally and the discharge DC/DC converter 20 is deactivated. In the embodiment shown in FIG. 3, this can be realized in such a way that the operating/discharge DC/DC converter 10, 20 is operated normally and the discharge circuit 30 is controlled in such a way that the storage device disconnector 31 is open and the mains disconnector 32 is closed.

In the various embodiments shown, the power supply circuit 100, 200 can be operated in a second operating mode (discharge mode) such that current or energy flows from the high-voltage branch 110 via the discharge DC/DC converter 20 into the discharge branch 130. The discharge voltage level is at most 60 V, i.e. it is safe to touch. Any high-voltage energy sources present in the vehicle, such as the electric motor 500 or a high-voltage energy storage device, are conveniently disconnected from the high-voltage network so that the voltage level in the high-voltage branch 110 (and thus in the connected high-voltage network) drops from the high-voltage level and reaches the discharge voltage level after a short time. The energy to be transferred is mainly contained in intermediate circuit capacities in the high-voltage network. The current intensity of the current flowing into the discharge branch 130 can also be regulated.

In the embodiment shown in FIG. 1, this can be realized in such a way that the operating DC/DC converter 10 is deactivated and the discharge DC/DC converter 20 is operated in such a way that it converts the high-voltage voltage present on the input side into a storage device voltage with the discharge voltage level on the output side. The energy is stored in the capacitor 131 and/or converted into heat in the resistor 132. The discharge DC/DC converter 20 can simultaneously regulate the current if desired.

In the embodiment shown in FIG. 3, this can be realized in different ways. In any case, the operating DC/DC converter 10 is now operated as a discharge DC/DC converter 20, whereby it converts the high-voltage voltage applied on the input side into a storage device voltage with the discharge voltage level on the output side. The storage device disconnector 31 is closed. In conjunction with a current intensity measurement (not shown) by the storage device disconnector 31, the storage device disconnector, if it is designed as a semiconductor switch, can simultaneously regulate the current level if desired.

In a first variant, the mains disconnector 32 is closed so that the discharge branch 130 and low-voltage branch 120 are connected. In this case, the energy or current from the high-voltage branch 110 can also be used to supply the low-voltage branch 120 or the low-voltage consumers 121 there, in parallel with storage device in the discharge branch 130. This is advantageous if the low-voltage consumers also fulfill safety-critical functions, which should not be dispensed with for as long as possible even in the event of a high-voltage fault. Accordingly, in this variant the operating/ discharge DC/DC converter 10, 20 is operated in such a way that the discharge voltage level corresponds to the low-voltage level so as not to damage the low-voltage consumers 121.

In another variant, the mains disconnector 32 is open so that the discharge branch 130 and the low-voltage branch 120 are not connected. In this case, the operating/discharge DC/DC converter 10, 20 is expediently operated so that the discharge voltage level is as high as possible, e.g. close to the permissible upper limit of 60 V, in order to reduce the voltage level in the high-voltage branch 110 as quickly as possible. This is advantageous if no low-voltage consumers need to be supplied from the high-voltage branch 110. The low-voltage consumers can then be supplied from the mains branch 120b and also fulfill safety-critical functions.

In this case, a time delay can be provided between the closing of the storage device disconnector 31 and the opening of the mains disconnector 32 in order to prevent the output side of the DC/DC converter from being switched open, i.e. to maintain an uninterrupted current flow via the DC/DC converter in order to prevent damage to the vehicle electrical network or the DC/DC converter.

In the various embodiments shown, the power supply circuit 100, 200 can be operated in a third operating mode (regenerative or feed-back mode) such that current or energy flows from the discharge branch 130 into the low-voltage branch 120 and/or back into the high-voltage branch 110 via the discharge DC/DC converter 20. This is advantageous if the event triggering the discharge mode (e.g. a fault in the inverter circuit) is rectified quickly enough or dissipates quickly enough so that energy is still available in the capacitor 131.

In the embodiment shown in FIG. 1, this can be realized in such a way that the operating DC/DC converter 10 remains deactivated and the discharge DC/DC converter 20 is operated in the opposite direction so that it converts the storage device voltage on the input side into a voltage with the high-voltage level on the output side. The use of a bidirectional discharge DC/DC converter 20 is advantageous for this purpose.

In the embodiment shown in FIG. 3, this can be realized in different ways.

In a first variant, the mains disconnector 32 is closed so that the discharge branch 130 and low-voltage branch 120 are connected. In this case, the energy or current from the discharge branch 130 can be used to supply the low-voltage branch 120 or the low-voltage consumers 121 located there. The operating/discharge DC/DC converter 10, 20 can be operated in the opposite direction as a "regenerative" or feed-back DC/DC converter, whereby it converts the storage device voltage on the input side into a voltage with the high-voltage level on the output side. The use of a bidirectional operating/discharge DC/DC converter 10, 20 is advantageous for this purpose. The DC/DC converter can also be deactivated.

In another variant, the mains disconnector 32 is open so that the discharge branch 130 and low-voltage branch 120 are not connected, and the operating/discharge DC/DC converter 10, 20 is operated in the opposite direction as a "regenerative" or feed-back DC/DC converter, converting the storage device voltage on the input side into a voltage with the high-voltage level on the output side. In this case, the stored energy is only fed back into the high-voltage branch.

In order to carry out the method and control the aforementioned DC/DC converters and switches, a computing unit 400 can be provided, which is set up in terms of programming and/or circuitry to carry out the corresponding steps.

In the present case, for example, the computing unit 400 is set up to output a discharge control signal S, which is distributed to the corresponding receivers, when a corresponding trigger situation exists, e.g. an accident, a fault in the inverter circuit 115 (which leads, for example, to an overvoltage in the high-voltage branch 110), etc.

For example, the discharge control signal S can be output to the inverter circuit 115 to cause the electrical machine 500 to be disconnected from the high-voltage branch 110. Alternatively or additionally, the inverter circuit 115 can be switched to a safe state, e.g. an active short circuit, in which all HS switches or all LS switches are closed. Alternatively or preferably additionally, high-voltage energy storage devices in a high-voltage network of the vehicle connected to the high-voltage terminals HV+, HV− can be disconnected from the high-voltage network.

For example, the discharge control signal S may be output to the discharge circuit 30 to cause the storage device disconnector 31 and the power disconnector 32 to be switched accordingly as described above.

For example, the discharge control signal S can be output to the discharge DC/DC converter 20 and the operating DC/DC converter 10 to cause them to be operated accordingly as described above. If necessary, an intermediate stage 401 can be provided which, in addition to an operating mode (ON/OFF, direction), also specifies an output voltage level for the operating DC/DC converter 10 or discharge DC/DC converter 20. In this case, the discharge control signal S can be a pure trigger signal which, for example, requests a discharge mode by means of a LOW level.

What is claimed is:

1. A method for operating a power supply circuit (100, 200) in an inverter (1) for driving an electrical machine (500), the power supply circuit (100, 200) in the inverter (1) comprising a high-voltage branch (110) with a high-voltage level, a low-voltage branch (120) with a low-voltage level, a discharge branch (130) with a discharge voltage level, the discharge voltage level being at most 60 V, an operating DC/DC converter (10), which is connected on the one hand to the high-voltage branch (110) and on the other hand to the low-voltage branch (120), a discharge DC/DC converter (20), which is connected on the one hand to the high-voltage branch (110) and on the other hand to the discharge branch (130), a low-voltage energy storage device (131), which is connected in the discharge branch (130), wherein the high-voltage level is higher than the low-voltage level and higher than the discharge voltage level, wherein the discharge branch (130) is different from the low-voltage branch (120), wherein the method comprises the steps of:

in a first operating mode, conducting current from the high-voltage branch (110) via the operating DC/DC converter (10) to the low-voltage branch (120), in a second operating mode, conducting current from the high-voltage branch (110) via the discharge DC/DC converter (20) to the discharge branch (130);

wherein in the second operating mode the discharge branch (130) and the low-voltage branch (120) are electrically connected, and the discharge voltage level corresponds to the low-voltage level, or the discharge branch (130) and the low-voltage branch (120) are not electrically connected, and the discharge voltage level is higher than the low-voltage level.

2. The method according to claim 1, further comprising converting energy stored in the low-voltage energy storage device (131) into heat, in particular in a low-voltage energy sink (132).

3. The method according to claim 1, wherein the discharge voltage level of the discharge branch (130) is kept constant in the second operating mode.

4. The method according to claim 1, wherein in the second operating mode the discharge voltage level of the discharge branch (130) is equal to or higher than the low-voltage level.

5. The method according to claim 1, wherein the operating DC/DC converter (10) and the discharge DC/DC converter (20) are the same DC/DC converter.

6. The method according to claim 1, comprising, in a third operating mode, conducting current from the discharge branch (130) via the discharge DC/DC converter (20) into the high-voltage branch (110).

7. The method according to claim 1, wherein a discharge circuit (30) is used, the discharge circuit (30) comprising a storage device disconnector (31) for connecting and disconnecting the low-voltage energy storage device (131) in parallel with an output of the discharge DC/DC converter (20), and/or comprising a mains disconnector (32) for connecting and disconnecting the low-voltage branch (120) and the discharge branch (130).

8. The method according to claim 7, wherein in the first operating mode the mains disconnector (32) is closed and the storage device disconnector (31) is open.

9. The method according to claim 7, wherein in the second operating mode the storage device disconnector (31) and the mains disconnector (32) are closed and the discharge voltage level of the discharge branch (130) corresponds to the low-voltage level.

10. The method according to claim 7, wherein in the second operating mode the storage device disconnector (31) is closed and the mains disconnector (32) is open and the discharge voltage level of the discharge branch (130) is higher than the low-voltage level.

11. The method according to claim 10, wherein the storage device disconnector (31) is closed first and the mains disconnector (32) is opened with a delay.

12. A computing unit (400) adapted to perform a method according to claim 1.

13. A power supply circuit (100, 200) in an inverter (1) for driving an electrical machine (500), the power supply circuit (100, 200) in the inverter (1) comprising
a high-voltage branch (110) with a high-voltage level,
a low-voltage branch (120) with a low-voltage level,
a discharge branch (130) with a discharge voltage level,
an operating DC/DC converter (10) which is connected on the one hand to the high-voltage branch (110) and on the other hand to the low-voltage branch (120),
a discharge DC/DC converter (20), which is connected on the one hand to the high-voltage branch (110) and on the other hand to the discharge branch (130), a low-voltage energy storage device (131), which is connected in the discharge branch (130),
wherein the discharge branch (130) is different from the low-voltage branch (120),
wherein the low-voltage branch (120) is set up to supply components (121, 115) of the inverter (1) with energy,
the power supply circuit (100, 200) further comprising a computing unit (400) according to claim 12.

14. The power supply circuit (100, 200) according to claim 13, further comprising a discharge circuit (30) which is switchable such that the high-voltage branch (110) is either electrically connected to the discharge branch (130) via the discharge DC/DC converter (20) or is electrically disconnected from the discharge branch (130).

15. The power supply circuit (100, 200) according to claim 13, wherein the discharge circuit (30) is switchable such that the high-voltage branch (110) is either electrically connected to the low-voltage branch (120) via the operating DC/DC converter (20) or is electrically disconnected from the low-voltage branch (120).

16. The power supply circuit (100, 200) according to claim 13, wherein a resistor (132) is connected in the discharge branch (130) as a low-voltage energy sink, wherein the low-voltage energy storage device (131) and the resistor (132) are connected in parallel.

17. An inverter (1) comprising the power supply circuit (100, 200) of claim 13 and an inverter circuit (115), the inverter circuit (115) comprising a number of semiconductor switches to be driven by means of drive signals, further comprising low-voltage terminals (B+, B−) adapted to be connected to a low-voltage network of a vehicle, high-voltage terminals (HV+, HV−) adapted to be connected to a high-voltage network (1) of the vehicle, and machine terminals (HV−, HV−) adapted to be connected to stator windings of the electrical machine (500).

* * * * *